United States Patent
Rusev et al.

(10) Patent No.: US 12,101,221 B2
(45) Date of Patent: Sep. 24, 2024

(54) POLICY-BASED AUTO-ENROLLMENT OF DEVICES IN OTA CAMPAIGNS

(71) Applicant: VMware LLC, Palo Alto, CA (US)

(72) Inventors: Sabo Rusev, Sofia (BG); Miroslav Mitevski, Sofia (BG); Militsa Borisova, Sofia (BG); Ivo Petkov, Sofia (BG); Dobromir Ivanov, Sofia (BG)

(73) Assignee: Omnissa, LLC, Palo Alto, CA (US)

( * ) Notice: Subject to any disclaimer, the term of this patent is extended or adjusted under 35 U.S.C. 154(b) by 0 days.

(21) Appl. No.: 18/050,061

(22) Filed: Oct. 27, 2022

(65) Prior Publication Data
US 2023/0075387 A1    Mar. 9, 2023

Related U.S. Application Data

(63) Continuation of application No. 16/249,066, filed on Jan. 16, 2019, now Pat. No. 11,533,222.

(51) Int. Cl.
| | | |
|---|---|---|
| H04L 41/0806 | (2022.01) | |
| G06F 8/65 | (2018.01) | |
| H04L 12/66 | (2006.01) | |
| H04L 41/0893 | (2022.01) | |
| H04L 67/00 | (2022.01) | |
| H04L 67/12 | (2022.01) | |
| G06F 8/71 | (2018.01) | |

(52) U.S. Cl.
CPC ............ *H04L 41/0806* (2013.01); *G06F 8/65* (2013.01); *H04L 12/66* (2013.01); *H04L 41/0893* (2013.01); *H04L 67/12* (2013.01); *H04L 67/34* (2013.01); *G06F 8/71* (2013.01)

(58) Field of Classification Search
CPC . H04L 41/0806; H04L 12/66; H04L 41/0893; H04L 67/12; H04L 67/34; G06F 8/65; G06F 8/71
See application file for complete search history.

(56) References Cited

U.S. PATENT DOCUMENTS

| | | | |
|---|---|---|---|
| 2014/0241354 A1 | 8/2014 | Shuman et al. | |
| 2016/0065653 A1 | 3/2016 | Chen et al. | |
| 2016/0072839 A1 | 3/2016 | Mortimore | |
| 2016/0294828 A1* | 10/2016 | Zakaria | H04L 63/0876 |
| 2016/0364223 A1 | 12/2016 | Vandikas et al. | |
| 2017/0094033 A1* | 3/2017 | Sathyadevan | H04L 67/12 |
| 2018/0109650 A1* | 4/2018 | Berdy | H04L 63/123 |
| 2018/0167485 A1* | 6/2018 | Arnold | H04L 41/046 |
| 2018/0255152 A1* | 9/2018 | Jeuk | H04L 67/63 |
| 2019/0020718 A1* | 1/2019 | Mathews | H04L 67/55 |

(Continued)

*Primary Examiner* — Chris Parry
*Assistant Examiner* — Abderrahmen Chouat
(74) *Attorney, Agent, or Firm* — Kim & Stewart LLP

(57) ABSTRACT

Disclosed are various embodiments for automatic enrollment of Internet of Things (IoT) endpoints. An identity of an IoT endpoint is verified by an IoT gateway. The IoT gateway is configured to transmit, over a network, an enrollment request to an IoT management service. The enrollment of the IoT endpoint with the IoT management service is confirmed. A compliance policy for the IoT endpoint is retrieved from a command queue. The compliance policy is stored in the command queue until retrieved by the IoT gateway. The IoT gateway enforces the compliance policy on the IoT endpoint.

21 Claims, 4 Drawing Sheets

(56) References Cited

U.S. PATENT DOCUMENTS

| | | |
|---|---|---|
| 2019/0074980 A1 | 3/2019 | Loreskar |
| 2019/0149618 A1* | 5/2019 | Tsai ..................... H04L 67/02 709/202 |
| 2019/0306242 A1* | 10/2019 | Thummalapalli ... H04L 41/0806 |
| 2019/0356542 A1 | 11/2019 | Chamarajnager et al. |
| 2019/0387489 A1* | 12/2019 | Idnani ................ H04L 12/2809 |
| 2020/0177589 A1* | 6/2020 | Mangalvedkar ........ H04W 4/50 |
| 2020/0389410 A1* | 12/2020 | Guim Bernat .......... H04L 67/10 |

* cited by examiner

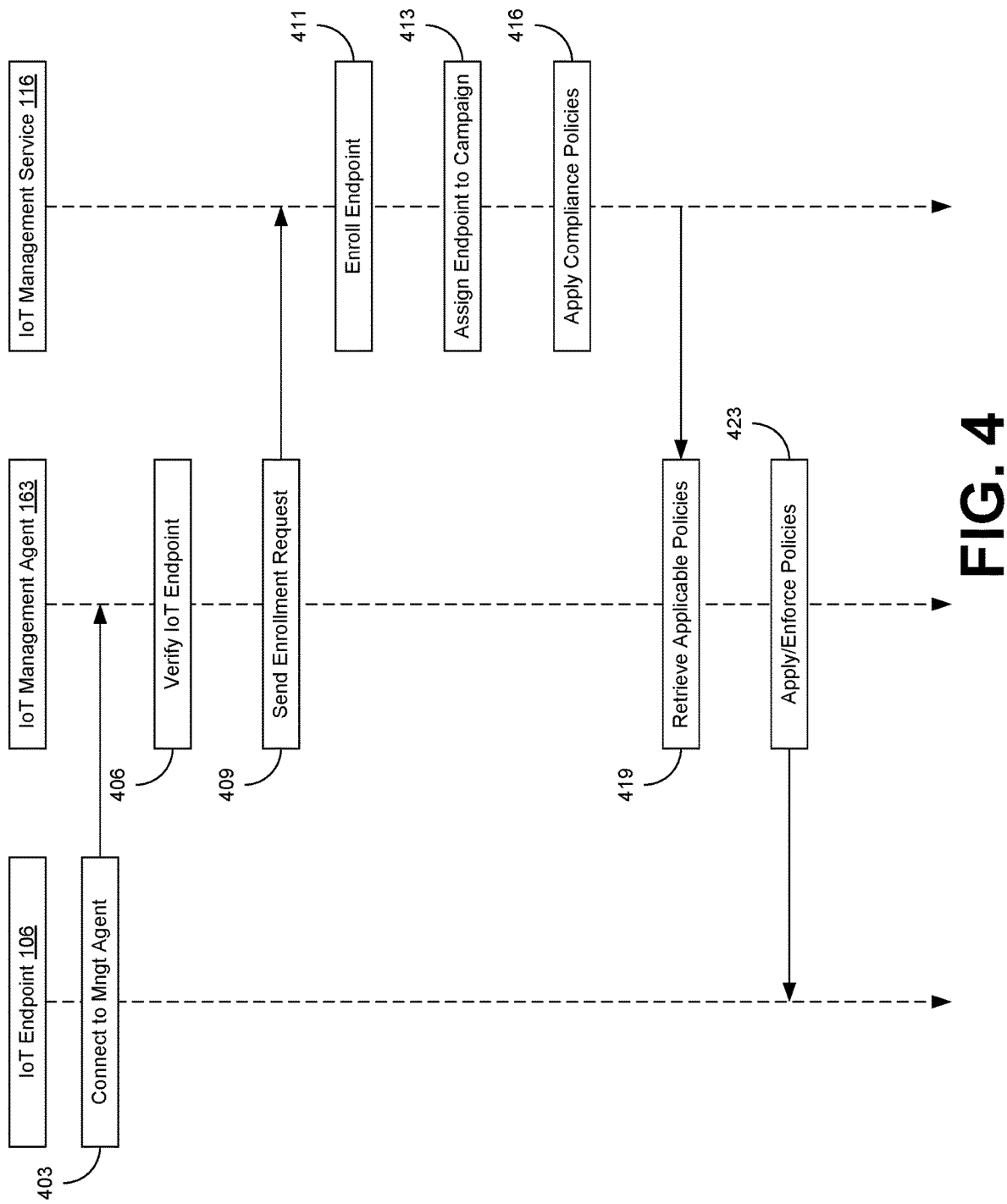

POLICY-BASED AUTO-ENROLLMENT OF DEVICES IN OTA CAMPAIGNS

CROSS-REFERENCE TO RELATED APPLICATIONS

This application is a continuation application that claims priority to U.S. application Ser. No. 16/249,066, titled "AUTO-ENROLLMENT OF IOT ENDPOINTS," filed on Jan. 16, 2019, which is incorporated herein by reference in its entirety.

BACKGROUND

As the costs for electronic components have decreased, network and computational capabilities have been added to a wide range of devices that were typically operated independently. For example, appliances have network connectivity and computing components, allowing household appliances such as a refrigerator to reorder food from the grocery store for delivery or for a washing machine or a dryer to send an alert to a smartphone indicating that the appliance is finished. Automobiles have network connectivity, allowing individual components of the automobile to connect to the Internet, such as, allowing the radio to stream music from the Internet. Even thermostats and sprinkler controllers have network connectivity, allowing adjustment of settings based on weather reports downloaded from the Internet or remote adjustment of settings using a smartphone or computing device. The ever expanding number of devices which incorporate network connectivity and computational ability is often referred to as the "Internet of Things."

However, the scale of the Internet of Things presents a number of management issues. For example, where an enterprise can have had a few hundred computers that could be manually administered by an information technology (IT) department, the number of devices in the Internet of Things can result in tens of thousands of network connected devices being deployed in an enterprise environment. Management of these devices, such as requirements to deploy security patches or update configuration settings, at such scale strains the resources of not just IT departments, but also of many automated solutions employed by enterprises for managing network connected devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4 is a sequence diagram depicting an example interaction between various components of the network environment of FIG. 1

DETAILED DESCRIPTION

Disclosed are various approaches for automating the enrollment and management of network connected devices, such as Internet of Things (IoT) devices. IoT devices from various manufacturers can be connected together within a local environment, such as a local network specific to a building or vehicle. Some devices can be able to interact with a management service, while others can be unable to communicate with or unaware of the management service. Accordingly, a gateway device can be used to relay communications between IoT devices and the management service. When the management service receives a message from the gateway device to enroll a new IoT device, the management service can automatically apply various policies to the IoT device.

Figure 1:
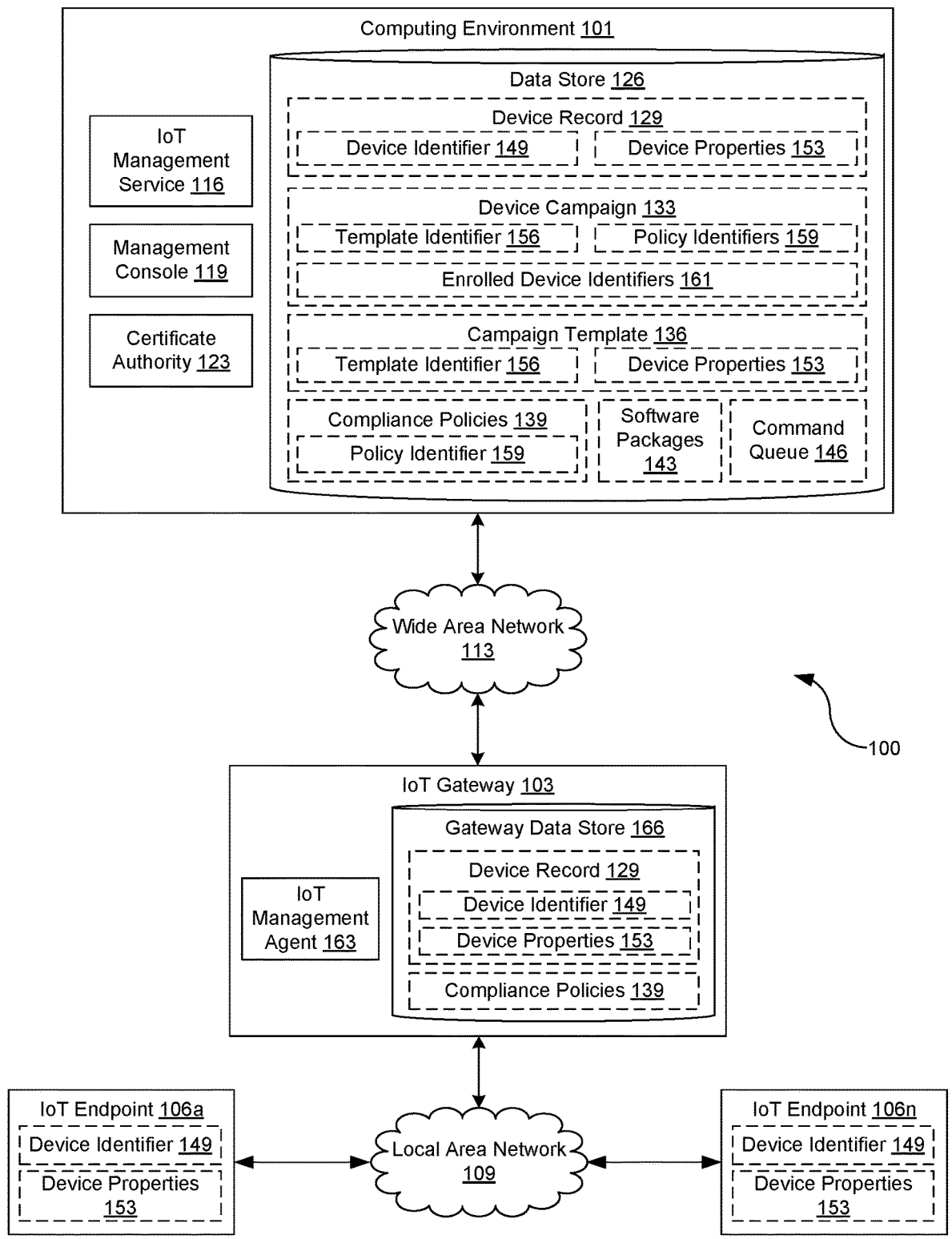
FIG. 1 is a drawing illustrating an example arrangement of a network environment according to various embodiments of the present disclosure.

As illustrated in FIG. 1, shown is a network environment 100 according to various embodiments. The network environment 100 includes a computing environment 101, an internet of things (IoT) gateway 103, and a number of IoT endpoints 106a-n. The computing environment 101, the IoT gateway 103, and the IoT endpoints 106a-n can be in data communication with each other. For example, multiple IoT endpoints 106a-n can be in data communication with each other or with an IoT gateway 103 over a local area network (LAN) 109. The IoT gateway 103 can in turn be in data communication with the computing environment 101 over a wide area network (WAN) 113.

The LAN 109 represents a computer network that interconnects computers within a limited area or a limited logical grouping. For example, the LAN 109 could include a wired or wireless network that connects computing devices within a building (such as a residence, office, school, laboratory, or similar building), collection of buildings (such as, a campus, an office or industrial park, or similar locale etc.), a vehicle (such as an automobile, an airplane, train, a boat or ship, or other vehicle), an organization (such as devices with network connectivity owned or leased by an organization), or other limited area or limited grouping of devices.

The WAN 113 represents a computer network that interconnects computers that are members of separate LANS 109. Accordingly, the WAN 113 can correspond to a network of networks, such as the Internet.

The LAN 109 and the WAN 113 can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless WI-FI® networks, BLUETOOTH® networks, microwave transmission networks, as well as other networks relying on radio broadcasts. The LAN 109 or the WAN 113 can also include a combination of two or more networks.

The computing environment 101 can include, for example, a server computer or any other system providing computing capability. Alternatively, the computing environment 101 can employ a plurality of computing devices that can be arranged, for example, in one or more server banks, computer banks, or other arrangements. Such computing devices can be located in a single installation or can be distributed among many different geographical locations. For example, the computing environment 101 can include a plurality of computing devices that together can include a hosted computing resource, a grid computing resource or any other distributed computing arrangement. In some cases, the computing environment 101 can correspond to an elastic computing resource where the allotted capacity of processing, network, storage, or other computing-related resources can vary over time.

Various applications or other functionality can be executed in the computing environment 101 according to various embodiments. The components executed on the computing environment 101, for example, can include an IoT management service 116, a management console 119, a certificate authority 123, and other applications, services, processes, systems, engines, or functionality not discussed in detail herein.

Also, various data is stored in a data store 126 that is accessible to the computing environment 101. The data store 126 can be representative of a plurality of data stores 126, which can include relational databases, object-oriented databases, hierarchical databases, hash tables or similar key-value data stores, as well as other data storage applications or data structures. The data stored in the data store 126 is associated with the operation of the various applications or functional entities described below. This data can include one or more device records 129, one or more device campaigns 133, one or more campaign templates 136, one or more compliance policies 139, one or more software packages 143, one or more command queues 146, and potentially other data.

The IoT management service 116 can be executed to oversee the operation of IoT gateways 103 and IoT endpoints 106 enrolled with the IoT management service 116. The IoT management service 116 can further cause device records 129 to be created, modified, or deleted (such as in response to enrollment or unenrollment or registration of an IoT endpoint 106). Commands issued by the IoT management service 116 for IoT endpoints 106 or IoT gateways 103, such as to apply settings or perform actions specified by compliance policies 139, can be stored in the command queue 146 by the IoT management service 116. As discussed later, the IoT gateway 103 can retrieve and execute any commands stored in the command queue 146.

The management console 119 can be executed to provide an administrative interface for configuring the operation of individual components in the network environment 100. For example, the management console 119 can provide an administrative interface for the IoT management service 116, and/or the certificate authority 123. The management console 119 can also provide an interface for the configuration of compliance policies 139 applicable to IoT endpoints 106. Accordingly, the management console 119 can correspond to a web page or a web application provided by a web server hosted in the computing environment 101.

The certificate authority 123 can be executed to issue and validate cryptographic certificates. For example, the certificate authority 123 can issue cryptographic certificates to services or devices in response to a request for a certificate. The certificate authority 123 can also validate the authenticity of certificates that have been issued by the certificate authority 123. For example, an application executing on the IoT gateway 103 or the IoT endpoint 106 can request that the certificate authority 123 validate a certificate issued to a service or server with which the IoT gateway 103 or IoT endpoint 106 is interacting.

A device record 129 can represent an IoT endpoint 106 enrolled with and managed by the IoT management service 116. Accordingly, a device record 129 can be created by the IoT management service 116 in response to enrollment of a respective IoT Endpoint 106. Therefore, each device record 129 can include a device identifier 149, one or more device properties 153, and potentially other data associated with an enrolled IoT endpoint 106.

A device identifier 149 can represent data that uniquely identifies an IoT endpoint 106 with respect to another IoT endpoint 106 and, therefore, allow one to uniquely identify one device record 129 with respect to another device record 129. Examples of device identifiers 149 include media access control (MAC) addresses of network interfaces of individual IoT endpoints 106, globally unique identifiers (GUIDs) or universally unique identifiers (UUIDs) assigned to enrolled IoT endpoints 106, international mobile equipment identifier (IMEI) numbers assigned to cellular modems of IoT endpoints 106, and tuples that uniquely identify an IoT endpoint 106 (such as a combination of a manufacturer name and serial number). However, other information can also be used as a device identifier 149 in various implementations.

A device property 153 can represent information related to or regarding an IoT endpoint 106. In some instances, a device property 153 can reflect the status of an IoT endpoint 106 or a component of an IoT endpoint 106. Examples of device properties 153 can include information about the IoT endpoint 106 itself, such as the manufacturer, model name and model number, model revision of the IoT endpoint 106. Similarly, device properties 153 can include information such as identifiers of software packages 143 installed on the IoT endpoint 106, version information for software packages 143 installed on the IoT endpoint 106, and potentially other information.

A device campaign 133 can represent a set or collection of compliance policies 139 that have been assigned to one or more IoT endpoints 106. When an IoT endpoint 106 is assigned to a device campaign 133, the IoT management service 116 can cause any compliance policies 139 identified by or associated with the device campaign 133 to be enforced on the IoT endpoint 106, as later described. Accordingly, the device campaign 133 can include a template identifier 156 for a campaign template 136 associated with the device campaign 133, one or more policy identifiers 159 that identify individual compliance policies 139 assigned to or associated with the device campaign 133, and a list of enrolled device identifiers 161 that includes device identifiers 149 identifying device records 129 for IoT endpoints 106 subject to the device campaign 133. Other information can also be stored in a device campaign 133 as desired for individual implementations.

A campaign template 136 can represent a definition of a class of IoT endpoints 106 to be assigned to or managed by a campaign. Accordingly, the campaign template 136 can include a template identifier 156 that uniquely identifies a campaign template 136 with respect other campaign templates 136. The template identifier 156, for example, can include an incremented integer or similar value, a GUID, a UUID, or similar unique identifier. The campaign template 136 can also include one or more device properties 153 that define the class of IoT endpoints 106 represented by the campaign template 136. Any enrolled devices with matching device properties 153 can be considered to match the campaign template 136, as discussed later.

A compliance policy 139 represents a definition of a state in which an IoT endpoint 106 is required to be. For example, a compliance policy 139 can specify that an IoT endpoint 106 have a particular version or a minimum version of a software package 143 installed. If the IoT endpoint 106 fails to have the version of the software package 143 installed, then the IoT endpoint 106 can be considered to be non-compliant. Other examples of compliance policies 139 can include a requirement that a particular setting for an IoT endpoint 106 be enabled or disabled, a requirement that the IoT endpoint 106 be configured in a particular manner, or other requirements appropriate for particular implementations. A compliance policy 139 can also include a policy identifier 159 that uniquely identifies a compliance policy 139 with respect to other compliance policies 139. Examples of policy identifiers 159 can include an incremented integer or similar value, a GUID, a UUID, or similar unique identifier.

Software packages 143 represent installers or installation packages for applications to be executed by an IoT endpoint 106 or firmware for the IoT endpoint. In some instances, the software package 143 can include an executable program that, when executed by an IoT endpoint 106, installs or updates a respective application on the IoT endpoint 106. In other instances, the installer represents a package of files that, when unpacked by an application executing on the IoT endpoint 106, results in the installation of the respective application. Examples of software packages include MICROSOFT WINDOWS® MSI and PPKG files, RED-HAT® Package Manager (RPM) files, DEBIAN® installer files, ANDROID® Package (APK) files, and similar package formats for applications of device firmware.

A command queue 146 can represent a queue of commands sent from an IoT management service 116 to an IoT management agent 163. When the IoT management service 116 sends a command or instruction, such as a command to apply a compliance policy 139 specified in a device campaign 133 to an IoT endpoint 106, the command can be stored in the command queue 146 until the IoT management agent 163 retrieves the command from the command queue 146. In some instances, a dedicated command queue 146 can be created for each instance of an IoT management agent 163. In other instances, however, a single command queue 146 can be used to store commands intended for multiple IoT management agents 163.

The IoT gateway 103 represents a computing device that acts as a proxy or relay between IoT endpoints 106*a-n* and the IoT Management service 116. For example, an IoT gateway 103 can represent a network access point or interface between the local area network 109 and the wide area network 113. In other instances, the IoT gateway 103 can be a dedicated device attached to the LAN 109 that communicates across the WAN 113 with the IoT management service 116 on behalf of IoT endpoints 106 attached to the LAN 109.

An IoT management agent 163 can be executed by the IoT gateway 103 to perform various functions on behalf of the IoT endpoints 106*a-n*. For example, the IoT management agent 163 can register or enroll IoT endpoints 106*a-n* with the IoT management service 116. As another example, the IoT management agent 163 can download, process, and enforce one or more applicable compliance policies 139. For instance, the IoT management agent 163 can retrieve a command from the command queue 146. The command can instruct the IoT management agent 163 to install an updated software package 143 on several IoT endpoints 106. Accordingly, the IoT management agent 163 could then download the specified version of the specified software package 143 and relay it to the respective IoT endpoints 106 for installation.

The gateway data store 166 can be representative of a plurality of gateway data stores 166, which can include relational databases, object-oriented databases, hierarchical databases, hash tables or similar key-value data stores, as well as other data storage applications or data structures. The data stored in the gateway data store 166 is associated with the operation of the various applications or functional entities described below. This data can include one or more device records 129 of respective IoT endpoints 106*a-n*, any applicable compliance policies 139, and potentially other information as appropriate for an implementation.

An IoT endpoint 106 is representative of any internet connected embedded device, appliance, sensor, or similar smart device. Examples of IoT endpoints 106 can include network connected home appliances (such as locks, refrigerators, thermostats, sprinkler controllers, smoke detectors, garage door openers, light-switches, fans, lights, security cameras, or similar devices), vehicular electronics (such as on-board diagnostic computers, entertainment systems, access controls, or similar devices), and other similar network connected devices. IoT endpoints 106 are often distinguishable from other client devices (such as personal computers or mobile devices) by their lack of functionality. For example, IoT endpoints 106 often do not provide general purpose computing abilities, lack an operating system that allows for a remote management service to gain direct administrative control over the IoT endpoint 106, and/or IoT endpoints 106 are not configured or configurable to execute an IoT management agent 163.

Often, an IoT endpoint 106 can also store a device identifier 149 that uniquely identifies the IoT endpoint 106 and one or more device properties 153. In some instances, one or more of these values can be set by the manufacturer. In other instances, one or more of these values can be set or specified by the IoT management service 116.

Next, a general description of the operation of the various components of the networked environment 100 is provided. However, more detailed descriptions of the operation of individual components of the networked environment 100 is set forth in the discussion of the subsequent figures.

To begin, an IoT endpoint 106 can enroll itself with the IoT management service 116. Accordingly, the IoT endpoint 106 can send a registration or enrollment request to the IoT management agent 163 executing on the IoT gateway 103. The enrollment request can include the device identifier 149 for the IoT endpoint 106. In some instances, the enrollment request can also include one or more device properties 153. However, in other instances, the device properties 153 can be provided later. In some implementations, the IoT endpoint 106 can sign the enrollment request using a certificate installed by the manufacturer of the IoT endpoint 106. However, the enrollment request can also include other authentication credentials in various implementations.

The IoT management agent 163 then verifies or authenticates the IoT endpoint 106. For example, the IoT management agent 163 can send a request to the certificate authority 123 to verify the certificate used to generate the signature of the enrollment request provided by the IoT endpoint 106.

After verifying the IoT endpoint 106, the IoT management agent 163 enrolls the IoT endpoint 106 with the IoT management service 116. For example, the IoT management agent 163 can relay the enrollment request from the IoT endpoint 106. As another example, the IoT management agent 163 can generate its own enrollment request that contains the device identifier 149. In some instances, the IoT management agent's 149 enrollment request can also include the device properties 153 of the IoT endpoint 106, if they were provided by the IoT endpoint 106.

In response to receipt of the enrollment request from the IoT management agent 163, the IoT management service 116 can perform several operations. First, the IoT management service 116 can verify the enrollment request. For example, the IoT management service 116 can verify with the certificate authority 123 the certificate used by the IoT management agent 163 or the IoT endpoint 106, as appropriate, to sign the enrollment request is a valid certificate.

If the certificate and signatures are valid, then the IoT management service 116 can proceed to enroll the IoT endpoint 106. For example, the IoT management service 116 can create a device record 129 for the IoT endpoint 106 that includes the device identifier 149 of the IoT endpoint 106. If the device properties 153 for the IoT endpoint 106 were included in the enrollment request, then the IoT management service 116 can include the device properties 153 in the device record 129 as well.

Otherwise, the IoT management service 116 can send a request to the IoT management agent 163 for the device properties 153 of the IoT endpoint 106 being registered. For example, the IoT management service 116 can place a command in a command queue 146 associated with the IoT management agent 163. When the IoT management agent 163 checks the command queue 146, it can retrieve the command requesting the device properties 153 of the IoT endpoint 106 and provide them in response. Upon receipt of the device properties 153 of the IoT endpoint 106 from the IoT management agent 163, the IoT management service 116 can add the device properties 153 to the device record 129 created for the IoT endpoint 106. At this point, the IoT endpoint 106 can be considered to be enrolled with the IoT management service 116.

In response to enrolling an IoT endpoint 106, the IoT management service 116 can automatically assign or subscribe the IoT endpoint 106 to one or more applicable device campaigns 133. For example, the IoT management service 116 can identify a campaign template 136 that the newly enrolled IoT endpoint 106 matches. For instance, the IoT management service 116 can compare the device properties 153 in the device record 129 with the device properties 153 specified in a campaign template 136. If each device property 153 specified in a campaign template 136 matches a respective device property 153 in the device record 129 of the newly enrolled IoT endpoint 106, then the IoT endpoint 106 can be considered to match the campaign template 136. Accordingly, the IoT management service 116 can then identify the device campaign 133 with the template identifier 156 of the matching campaign template 136 and add the device identifier 149 of the IoT endpoint 106 to the enrolled device identifiers 161 of the device campaign 133. As a result, the IoT endpoint 106 is enrolled in the device campaign 133.

Upon enrollment in the device campaign 133, one or more compliance policies 139 specified by the device campaign 133 can then be applied to the IoT endpoint 106. For example, a compliance policy 139 specifying that a specific software package 143 or version of a software package 143 be installed on an IoT endpoint 106 can be enforced. As another example, a compliance policy 139 specifying specific configuration values for the IoT endpoint 106 can be enforced.

To enforce a compliance policy 139 for a newly registered or enrolled IoT endpoint 106, the IoT management service 116 can retrieve the set of policy identifiers 159 specified by a device campaign 133 to which the IoT endpoint 106 has been assigned or subscribed. The IoT management service 116 can then create a command specifying the device identifier 149 of the IoT endpoint 106 and the policy identifiers 159 for each compliance policy 139 listed in the device campaign 133. The command can then be inserted into a command queue 146 associated with the IoT management agent 163 the registered or enrolled the IoT endpoint 106.

The IoT management agent 163 can later retrieve the command from the command queue 146 and analyze the command. For example, after retrieving the command, the IoT management agent 163 can retrieve the specified compliance policies 139 and enforce the compliance policies 139. For instance, if a compliance policy 139 specifies that a particular software package 143 or version of a software package 143 is to be installed on an IoT endpoint 106, then the IoT management agent 163 can retrieve the appropriate software package 143 and send it to the IoT endpoint 106 for installation. As another example, if a compliance policy 139 specifies that a particular configuration setting be set to a particular value, then the IoT management agent 163 could cause the IoT endpoint 106 to change the value for the setting.

After applying the compliance policies, the IoT management agent 163 can send a response to the IoT management service 116 indicating that the compliance policies 139 were successfully applied. The IoT management service 116 could then update a device record 129 for the IoT endpoint 106 to indicate that the device campaign 133 has been successfully applied to the IoT endpoint 106.

Figure 2:
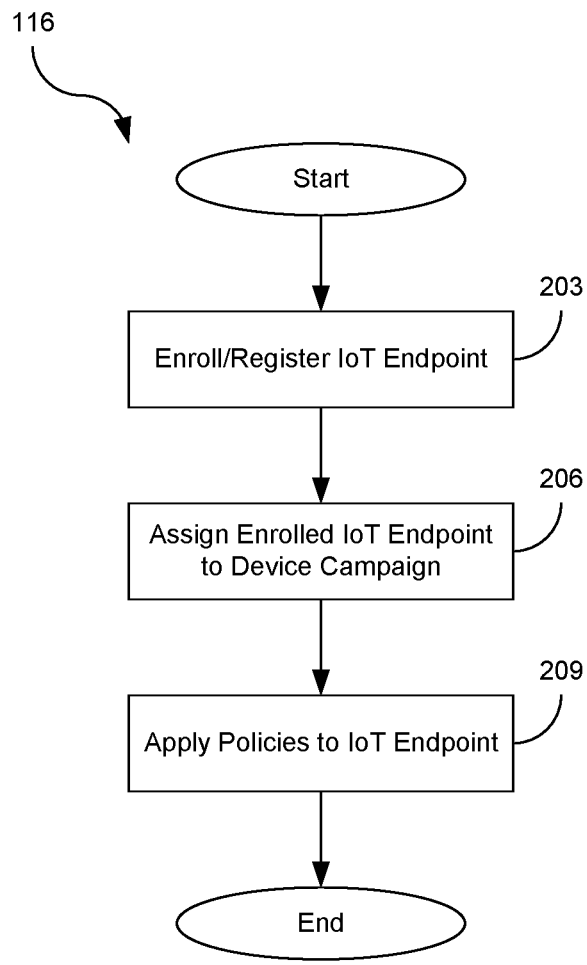
FIGS. 2 and 3 are flowcharts depicting examples of the operation of components of the network environment of FIG. 1.

Referring next to FIG. 2, shown is a flowchart that provides one example of the operation of the IoT management service 116. It is understood that the flowchart of FIG. 2 provides merely an example of the many different types of functional arrangements that can be employed to implement the operation of the IoT management service 116. As an alternative, the flowchart of FIG. 2 can be viewed as depicting an example of elements of a method implemented in the computing environment 101.

Beginning at step 203, the IoT management service 116 enrolls or registers an IoT endpoint 106 in response to an enrollment or registration request received from the IoT management agent 163. For example, the IoT management service 116 can create a device record 129 for the IoT endpoint 106 that includes the device identifier 149 of the IoT endpoint 106. If the device properties 153 for the IoT endpoint 106 were included in the enrollment request, then the IoT management service 116 can include the device properties 153 in the device record 129 as well. Otherwise, the IoT management service 116 can send a request to the IoT management agent 163 for the device properties 153 of the IoT endpoint 106 being registered. For example, the IoT management service 116 can place a command in a command queue 146 associated with the IoT management agent 163 that instructs the IoT management agent 163 to provide the device properties 153 for the IoT endpoint 106. Upon receipt of the device properties 153 of the IoT endpoint 106 from the IoT management agent 163, the IoT management service 116 can add the device properties 153 to the device record 129 created for the IoT endpoint 106. At this point, the IoT endpoint 106 can be considered to be enrolled with the IoT management service 116.

In some implementations, the IoT management service 116 can also verify the enrollment request for the IoT endpoint 106 that was received from the IoT management agent 163. For example, the IoT management service 116 can verify with the certificate authority 123 that the certificate used by the IoT management agent 163 or the IoT endpoint 106, as appropriate, to sign the enrollment request is a valid certificate. If the certificate and signatures are valid, then the IoT management service 116 can proceed to enroll the IoT endpoint 106.

Then at step 206, the IoT management service 116 can automatically assign or subscribe the IoT endpoint 106 to one or more applicable device campaigns 133. For example, the IoT management service 116 can identify a campaign template 136 that the newly enrolled IoT endpoint 106 matches. For instance, the IoT management service 116 can compare the device properties 153 in the device record 129 with the device properties 153 specified in a campaign template 136. If each device property 153 specified in a campaign template 136 matches a respective device property 153 in the device record 129 of the newly enrolled IoT endpoint 106, then the IoT endpoint 106 can be considered to match the campaign template 136. Accordingly, the IoT management service 116 can then identify the device campaign 133 with the template identifier 156 of the matching campaign template 136, and can add the device identifier 149 of the IoT endpoint 106 to the enrolled device identifiers 161 of the device campaign 133. As a result, the IoT endpoint 106 is enrolled in the device campaign 133.

Next at step 209, IoT management service 116 can cause one or more compliance policies 139 associated with the device campaign 133 to be applied to the newly enrolled IoT endpoint 106. To enforce a compliance policy 139 for a newly registered or enrolled IoT endpoint 106, the IoT management service 116 can retrieve the set of policy identifiers 159 specified by a device campaign 133 to which the IoT endpoint 106 has been assigned or subscribed. The IoT management service 116 can then create a command specifying the device identifier 149 of the IoT endpoint 106 and the policy identifiers 159 for each compliance policy 139 listed in the device campaign 133. The command can then be inserted into a command queue 146 associated with the IoT management agent 163 registered or enrolled the IoT endpoint 106.

Figure 3:
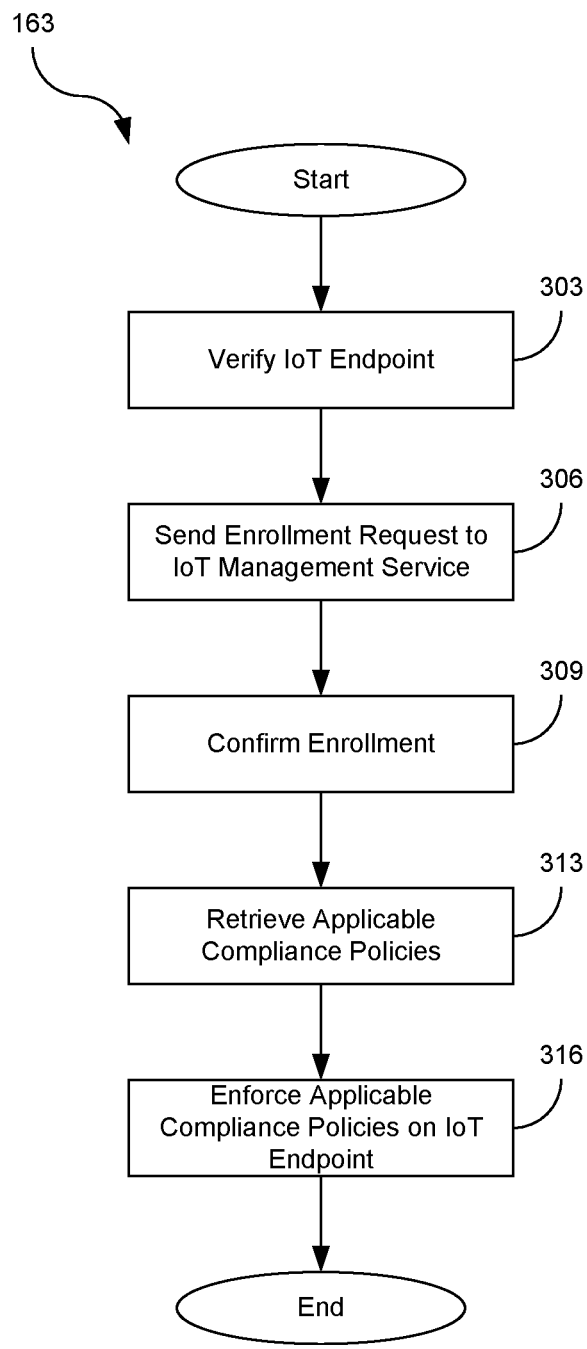

Referring next to FIG. 3, shown is a flowchart that provides one example of the operation of the IoT management agent 163. It is understood that the flowchart of FIG. 3 provides merely an example of the many different types of functional arrangements that can be employed to implement the operation of the IoT management agent 163. As an alternative, the flowchart of FIG. 3 can be viewed as depicting an example of elements of a method implemented in the computing environment 101.

Beginning at step 303, the IoT management agent 163 can verify the identity of an IoT endpoint 106 communicating through the LAN 109 with the IoT management agent 163. For example, the IoT management agent 163 can verify the identity of the IoT endpoint 106 in response to the IoT endpoint 106 joining or being connected to the LAN 109. Similarly, the IoT management agent 163 can verify the identity of the IoT endpoint 106 in response to a request from the IoT endpoint 106 to enroll with the IoT management service 116.

Verification can be performed using various approaches. For example, the IoT endpoint 106 can use a preinstalled certificate to authenticate itself with the IoT management agent 163. Accordingly, the IoT management agent 163 can communicate with the certificate authority 123 to determine the validity of the certificate. If the certificate is valid, then the IoT endpoint 106 can be considered to be authenticated.

Next at step 306, the IoT management agent 163 can send an enrollment request to the IoT management service 116 to enroll the IoT endpoint 106. In some instances, the enrollment request can have been initiated by the IoT endpoint 106. In these instances, the IoT management agent 163 can simply relay the request from the IoT endpoint 106 to the IoT management service 116. However, in other instances, the IoT endpoint 106 can be unaware of the IoT management service 116, not configured to communicate or interact with the IoT management service 116, or otherwise incapable of interacting with the IoT management service 116. For example, an IoT endpoint 106, such as a consumer device or simple IoT device, can not have any built-in functionality or awareness of the IoT management service 116. However, the IoT management agent 163 on the IoT gateway 103 can be able to interact with both the IoT endpoint 106 and the IoT management service 116. Accordingly, the IoT management agent 163 can enroll the IoT endpoint 106 with the IoT management service 116 and enforce any applicable compliance policies 139 applicable to the IoT endpoint 106 on behalf of the IoT management service 116.

Various information can be included in the enrollment request. Usually, the device identifier 149 for the IoT endpoint 106 being enrolled is included in the enrollment request. In some instances, additional device properties 153 provided by the IoT endpoint 106 can be included in the enrollment request. In other instances, the IoT management service 116 will request relevant device properties 153 as part of the enrollment process. In these instances, the IoT management agent 163 will provide the device properties 153 for the IoT endpoint 106 being registered in response. For example, the IoT management agent 163 can retrieve a command from the command queue 146 that requests one or more device properties 153 of the IoT endpoint 106. In response, the IoT management agent 163 can either provide device properties 153 for the IoT endpoint 106 that are cached in the gateway data store 166 or the IoT management agent 163 can request the device properties from the IoT endpoint 106 and relay them to the IoT management service 116.

Then at step 309, the IoT management agent 163 can confirm enrollment with the IoT management service 116. For example, the IoT management agent 163 can receive a response from the IoT management service 116 that enrollment was successful.

Subsequently at step 313, the IoT management agent 163 can retrieve one or more applicable compliance policies 139 for the newly enrolled IoT endpoint 106. For example, the IoT management agent 163 can retrieve one or more commands from the command queue 146. One or more of these commands can specify a policy identifier 159 of a compliance policy 139 to be enforced on or applied to the newly enrolled IoT endpoint 106. In response, the IoT management agent 163 can retrieve the applicable compliance policies 139 identified by the policy identifiers 159 listed in the commands retrieved from the command queue 146.

Then, at step 316, the IoT management agent 163 can cause the applicable compliance policies 139 to be enforced for the newly enrolled IoT endpoint 106. As an example, if the compliance policy 139 specifies that a specific software package 143 or version of a software package 143 be installed on the IoT endpoint 106, the IoT management agent 163 can invoke a function provided by an application programming interface (API) of the IoT endpoint 106 to cause the IoT endpoint 106 to download and install the software package 143. An argument to the function could be the network address or path for the software package 143 to be installed. As another example, the IoT management agent 163 could retrieve the software package 143 and provide it to the IoT endpoint 106 (such as an argument to a function provided by an API) for installation. If the compliance policy 139 specified a value for a configuration setting of the IoT endpoint 106, then the IoT management agent 163 could similarly invoke a function provided by an API of the IoT endpoint 106 to modify the setting to the value specified in the compliance policy 139. Once all of the compliance policies 139 have been enforced or applied to the IoT endpoint 106, the process can end.

FIG. 4 is a sequence diagram depicting the interaction between various components of the network environment 100. It is understood that the sequence diagram of FIG. 4 provides merely an example of the many different types of functional arrangements that can be employed to implement the operation of the network environment 100. As an alternative, the sequence diagram of FIG. 4 can be viewed as depicting an example of elements of a method implemented in the network environment 100.

Beginning at step 403, the IoT endpoint 106 connects to the IoT management agent 163 over the LAN 109. This connection can occur in a number of scenarios. For example, the IoT management agent 163 can detect network traffic from the IoT endpoint 106. As another example, the IoT management agent 163 can receive a request from the IoT endpoint 106. One example of a request is an enrollment request from the IoT endpoint 106 to enroll or register with the IoT management service 116.

Then at step 406, the IoT management agent 163 can verify the identity of an IoT endpoint 106 communicating through the LAN 109 with the IoT management agent 163. For example, the IoT management agent 163 can verify the identity of the IoT endpoint 106 in response to the IoT endpoint 106 joining or being connected to the LAN 109. Similarly, the IoT management agent 163 can verify the identity of the IoT endpoint 106 in response to a request from the IoT endpoint 106 to enroll with the IoT management service 116.

Verification can be performed using various approaches. For example, the IoT endpoint 106 can use a preinstalled certificate to authenticate itself with the IoT management agent 163. Accordingly, the IoT management agent 163 can communicate with the certificate authority 123 to determine the validity of the certificate. If the certificate is valid, then the IoT endpoint 106 can be considered to be authenticated.

Later, at step 409, the IoT management agent 163 can send an enrollment request to the IoT management service 116 on behalf of the IoT endpoint 106. The enrollment request can include a device identifier 149 and potentially other information, such as one or more device properties of the IoT endpoint 106.

Next, at step 411, the IoT management service 116 enrolls or registers an IoT endpoint 106 in response to an enrollment or registration request received from the IoT management agent 163. For example, the IoT management service 116 can create a device record 129 for the IoT endpoint 106 that includes the device identifier 149 of the IoT endpoint 106. If the device properties 153 for the IoT endpoint 106 were included in the enrollment request, then the IoT management service 116 can include the device properties 153 in the device record 129 as well. Otherwise, the IoT management service 116 can send a request to the IoT management agent 163 for the device properties 153 of the IoT endpoint 106 being registered. For example, the IoT management service 116 can place a command in a command queue 146 associated with the IoT management agent 163 that instructs the IoT management agent 163 to provide the device properties 153 for the IoT endpoint 106. Upon receipt of the device properties 153 of the IoT endpoint 106 from the IoT management agent 163, the IoT management service 116 can add the device properties 153 to the device record 129 created for the IoT endpoint 106. At this point, the IoT endpoint 106 can be considered to be enrolled with the IoT management service 116.

In some implementations, the IoT management service 116 can also verify the enrollment request for the IoT endpoint 106 that was received from the IoT management agent 163. For example, the IoT management service 116 can verify with the certificate authority 123 that the certificate used by the IoT management agent 163 or the IoT endpoint 106, as appropriate, to sign the enrollment request is a valid certificate. If the certificate and signatures are valid, then the IoT management service 116 can proceed to enroll the IoT endpoint 106.

Subsequently at step 413, the IoT management service 116 can automatically assign or subscribe the IoT endpoint 106 to one or more applicable device campaigns 133. For example, the IoT management service 116 can identify a campaign template 136 that the newly enrolled IoT endpoint 106 matches. For instance, the IoT management service 116 can compare the device properties 153 in the device record 129 with the device properties 153 specified in a campaign template 136. If each device property 153 specified in a campaign template 136 matches a respective device property 153 in the device record 129 of the newly enrolled IoT endpoint 106, then the IoT endpoint 106 can be considered to match the campaign template 136. Accordingly, the IoT management service 116 can then identify the device campaign 133 with the template identifier 156 of the matching campaign template 136 and add the device identifier 149 of the IoT endpoint 106 to the enrolled device identifiers 161 of the device campaign 133. As a result, the IoT endpoint 106 is enrolled in the device campaign 133.

Then at step 416, IoT management service 116 can cause one or more compliance policies 139 associated with the device campaign 133 to be applied to the newly enrolled IoT endpoint 106. To enforce a compliance policy 139 for a newly registered or enrolled IoT endpoint 106, the IoT management service 116 can retrieve the set of policy identifiers 159 specified by a device campaign 133 to which the IoT endpoint 106 has been assigned or subscribed. The IoT management service 116 can then create a command specifying the device identifier 149 of the IoT endpoint 106 and the policy identifiers 159 for each compliance policy 139 listed in the device campaign 133. The command can then be inserted into a command queue 146 associated with the IoT management agent 163 the registered or enrolled the IoT endpoint 106.

Accordingly, at step 419, the IoT management agent 163 can retrieve one or more applicable compliance policies 139 for the newly enrolled IoT endpoint 106. For example, the IoT management agent 163 can retrieve one or more commands from the command queue 146. One or more of these commands can specify a policy identifier 159 of a compliance policy 139 to be enforced on or applied to the newly enrolled IoT endpoint 106. In response, the IoT management agent 163 can retrieve the applicable compliance policies 139 identified by the policy identifiers 159 listed in the commands retrieved from the command queue 146.

Then at step 423, the IoT management agent 163 can cause the applicable compliance policies 139 to be enforced for the newly enrolled IoT endpoint 106. As an example, if the compliance policy 139 specifies that a specific software package 143 or version of a software package 143 be installed on the IoT endpoint 106, the IoT management agent 163 can invoke a function provided by an application programming interface (API) of the IoT endpoint 106 to cause the IoT endpoint 106 to download and install the software package 143. An argument to the function could be the network address or path for the software package 143 to be installed. As another example, the IoT management agent 163 could retrieve the software package 143 and provide it to the IoT endpoint 106 (such as an argument to a function provided by an API) for installation. If the compliance policy 139 specified a value for a configuration setting of the IoT endpoint 106, then the IoT management agent 163 could similarly invoke a function provided by an API of the IoT endpoint 106 to modify the setting to the value specified in the compliance policy 139. Once all of the compliance policies 139 have been enforced or applied to the IoT endpoint 106, the process can end.

Although the IoT management service 116, the IoT management agent 119, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
    a computing device comprising a processor and a memory;
    machine readable instructions stored in the memory that, when executed by the processor, cause the computing device to at least:
    verify, at a management agent executing in an internet of things (IOT) gateway, an identity of an IoT endpoint that is communicating with the IoT gateway through a local network;
    transmit, by management agent over a wide area network, an enrollment request to an IoT management service, the enrollment request comprising a property of the IoT endpoint;
    confirm, by the management agent, an enrollment of the IoT endpoint with the IoT management service;
    retrieve, by the management agent, a command from a command queue of the IoT management service, the command specifying a device identifier for the IoT endpoint and a policy identifier for a compliance policy of a campaign applicable to a plurality of IoT endpoints that includes the IoT endpoint, the command being stored in the command queue until being retrieved;
    retrieve, by the management agent from a data store of the IoT gateway, the compliance policy for the IoT endpoint based at least in part on the command specifying the policy identifier; and
    enforce, by the management agent, the compliance policy on the IoT endpoint.

2. The system of claim 1, wherein the verification of the IoT endpoint further causes the computing device to at least:
    communicate with a certificate authority to verify a pre-installed certificate received from the IoT endpoint.

3. The system of claim 1, wherein the verification of the IoT endpoint further causes the computing device to at least:
    initiate the verification of the IoT endpoint based at least in part on a detection of the IoT endpoint being connected to the local network.

4. The system of claim 1, wherein the enrollment request comprises the device identifier for the IoT endpoint.

5. The system of claim 1, wherein the property of the IoT endpoint comprises a version identifier of an application installed on the IoT endpoint.

6. The system of claim 1, wherein the property of the IoT endpoint comprises a model name and a model number of the IoT endpoint.

7. The system of claim 1, wherein the machine readable instructions, when executed by the processor, further cause the computing device to at least:
    retrieve a request for a second device property associated with the IoT endpoint based on accessing the command queue, wherein the request is stored in the command queue by the IoT management service and the request is stored in the command queue until retrieved by the computing device; and identify the second device property associated with the IoT endpoint based on the second device property being cached in the memory.

8. The system of claim 1, wherein the compliance policy specifies a software package, and wherein the machine readable instructions cause the computing device to invoke, by the management agent, an application programming interface (API) of the IoT endpoint to download and install the software package.

9. A method, comprising:
verifying, at a management agent executing in an internet of things (IOT) gateway, an identity of an IoT endpoint that is communicating with an IoT gateway through a local network;
transmitting, by the management agent over a wide area network, an enrollment request to an IoT management service, the enrollment request comprising a property of the IoT endpoint;
confirming, by the management agent, an enrollment of the IoT endpoint with the IoT management service;
retrieving, by the management agent, a command from a command queue of the IoT management service, the command specifying a device identifier for the IoT endpoint and a policy identifier for a compliance policy of a campaign applicable to a plurality of IoT endpoints that includes the IoT endpoint;
retrieving, by the management agent from a data store of the IoT gateway, the compliance policy for the IoT endpoint based at least in part on the command specifying the policy identifier; and
enforcing, by the management agent, the compliance policy on the IoT endpoint.

10. The method of claim 9, wherein verifying the IoT endpoint further comprising:
communicating with a certificate authority to verify a preinstalled certificate received from the IoT endpoint.

11. The method of claim 9, wherein verifying the IoT endpoint further comprising:
initiating the verification of the IoT endpoint based at least in part on a detection of the IoT endpoint being connected to the local network.

12. The method of claim 9, wherein the enrollment request comprises the device identifier for the IoT endpoint.

13. The method of claim 9, wherein the property of the IoT endpoint comprises a version identifier of an application installed on the IoT endpoint.

14. The method of claim 9, wherein the property of the IoT endpoint comprises a model name and a model number of the IoT endpoint.

15. The method of claim 9, further comprising:
retrieving a request for a second device property associated with the IoT endpoint based on accessing the command queue, wherein the request is stored in the command queue by the IoT management service and the request is stored in the command queue until retrieved by the computing device; and
identifying the second device property associated with the IoT endpoint based on the second device property being cached in a memory.

16. A non-transitory, computer-readable medium, comprising machine readable instructions that, when executed by a processor, cause a computing device to at least:
verify, at a management agent executing in an internet of things (IOT) gateway, an identity of an IoT endpoint that is communicating with an IoT gateway through a local network;
transmit, by the management agent over a wide area network, an enrollment request to an IoT management service, the enrollment request comprising a property of the IoT endpoint;
confirm, by the management service, an enrollment of the IoT endpoint with the IoT management service;
retrieve, by the management agent, a command from a command queue of the IoT management service, the command specifying a device identifier for the IoT endpoint and a policy identifier for a compliance policy of a campaign applicable to a plurality of IoT endpoints that includes the IoT endpoint;
retrieve, by the management agent from a data store of the IoT gateway, the compliance policy for the IoT endpoint based at least in part on the command specifying the policy identifier; and
enforce, by the management agent, the compliance policy on the IoT endpoint.

17. The non-transitory, computer-readable medium of claim 16, wherein the verification of the IoT endpoint further causes the computing device to at least:
communicate with a certificate authority to verify a preinstalled certificate received from the IoT endpoint.

18. The non-transitory, computer-readable medium of claim 16, wherein the verification of the IoT endpoint further causes the computing device to at least:
initiate the verification of the IoT endpoint based at least in part on a detection of the IoT endpoint being connected to the local network.

19. The non-transitory, computer-readable medium of claim 16, wherein the enrollment request comprises the device identifier for the IoT endpoint.

20. The non-transitory, computer-readable medium of claim 16, wherein the property of the IoT endpoint comprises a version identifier of an application installed on the IoT endpoint.

21. The non-transitory, computer-readable medium of claim 16, wherein the machine readable instructions, when executed by the processor, cause the computing device to at least:
retrieve a request for a second device property associated with the IoT endpoint based on accessing the command queue, wherein the request is stored in the command queue by the IoT management service and the request is stored in the command queue until retrieved by the computing device; and
request the second device property from the IoT endpoint based at least in part on the request retrieved from the command queue;
receive the second device property from the IoT endpoint; and
transmit the second device property to the IoT management service.

* * * * *